United States Patent
Sayeedi et al.

(10) Patent No.: US 7,912,009 B2
(45) Date of Patent: Mar. 22, 2011

(54) METHOD AND APPARATUS FOR SUPPORTING MOBILITY IN INTER-TECHNOLOGY NETWORKS

(75) Inventors: Shahab M. Sayeedi, Naperville, IL (US); Xiang Xu, Nanjing (CN)

(73) Assignee: Motorola Mobility, Inc., Libertyville, IL (US)

( * ) Notice: Subject to any disclaimer, the term of this patent is extended or adjusted under 35 U.S.C. 154(b) by 811 days.

(21) Appl. No.: 11/531,913

(22) Filed: Sep. 14, 2006

(65) Prior Publication Data

US 2008/0069070 A1 Mar. 20, 2008

Related U.S. Application Data

(60) Provisional application No. 60/764,933, filed on Feb. 3, 2006.

(51) Int. Cl.
*H04W 4/00* (2009.01)
*H04B 7/216* (2006.01)

(52) U.S. Cl. .......................................... 370/331; 370/342
(58) Field of Classification Search .................. 370/331, 370/342
See application file for complete search history.

(56) References Cited

U.S. PATENT DOCUMENTS

| 2005/0053034 A1 | 3/2005 | Chiueh |
| 2006/0159047 A1 | 7/2006 | Olvera-Hernandez et al. |
| 2007/0021119 A1* | 1/2007 | Lee et al. ............... 455/436 |

OTHER PUBLICATIONS 3G 3rd Generation Partnership Project 2 "3GPP2", Modification on IWS definition, Hitachi, Apr. 25, 2005, Kansas City, MO, A40-20060425-012, Sec. 1, 1.3.2, 1.73. 4.6, 4.6.1.
3G 3rd Generation Partnership Project 2 "3GPP2", TSG-A, Use of A21 for All CSNA, 3GPP2-A40-20060522-009, pp. 1-46.
3G 3rd Generation Partnership Project 2 "3GPP2", HRPD network attach status info update, A40-20060626-005, Miyazaki, Japan, Jun. 2006, pp. 1-3.
3G 3rd Generation Partnership Project 2 "3GPP2", Interoperability Specification (IOS) for High Rate Packet Data (HRPD) Radio Access Network Interfaces with Session Control in the Packet Control Function, 3GPP2 A. S0009-B v0.2 VV, Mar. 2006, Section 1.4.
3G 3rd Generation Partnership Project 2 "3GPP2", Interoperability Specification (IOS) for High Rate Packet Data (HRPD) Radio Access Network Interfaces with Session Control in the Access Network, V&V Version, 3GPP2 a.S0008-B v0.2 VV, Mar. 2006, Section 1.4.

* cited by examiner

*Primary Examiner* — Nghi H Ly
*Assistant Examiner* — Timothy Pham

(57) ABSTRACT

Various embodiments are described for supporting mobility in an inter-technology network. Such a network (300, e.g.) includes multiple interconnected access networks, utilizing various access technologies, and perhaps having overlapping, but non-aligned coverage areas. The prior art relies on remote units to originate registration signaling as they move from one service coverage area or registration region to the next, for each of the various access networks. In contrast, embodiments of the present invention utilize network originated signaling to update overlapping networks/network nodes of mobility events of which one access network (120-122, e.g.) is aware but of which other access networks (130, 131 and 133, e.g.) may not be aware.

19 Claims, 7 Drawing Sheets

100

- PRIOR ART -

- PRIOR ART -    FIG. 2

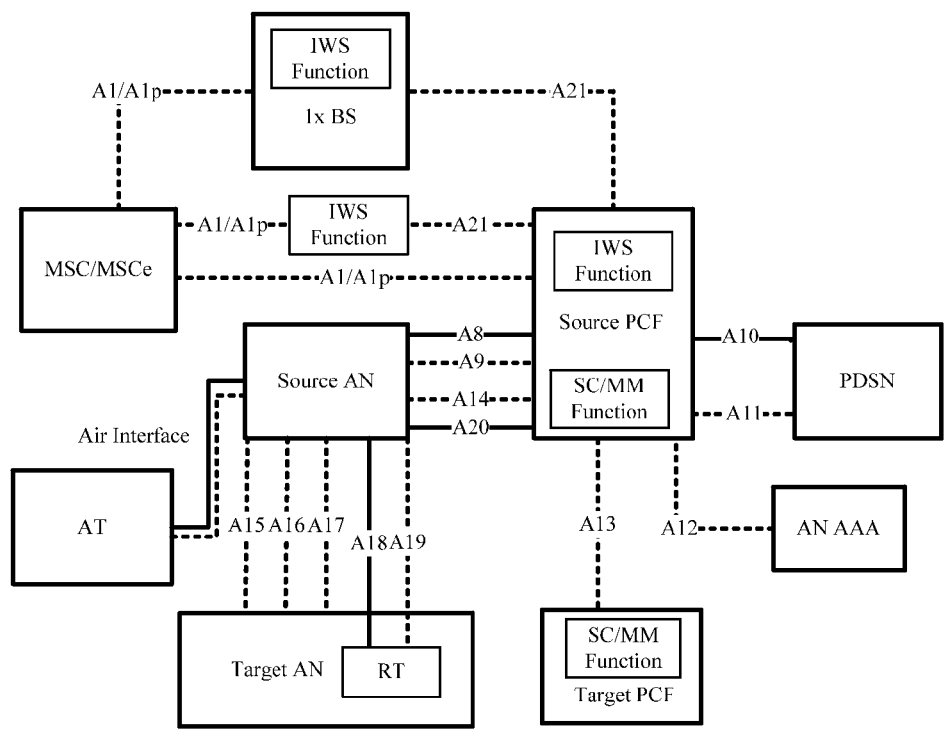
- PRIOR ART -     FIG. 7

METHOD AND APPARATUS FOR SUPPORTING MOBILITY IN INTER-TECHNOLOGY NETWORKS

REFERENCE(S) TO RELATED APPLICATION(S)

This application is related to a co-pending application Ser. No. 11/141,926, entitled "METHOD AND APPARATUS TO FACILITATE INTER-OPERABILITY BETWEEN A 3G1X NETWORK AND A WIRELESS PACKET DATA NETWORK," filed Jun. 1, 2005, which is assigned to the assignee of the present application.

This application is related to a provisional application Ser. No. 60/764,933, entitled "METHOD AND APPARATUS FOR PROVIDING SERVICE IN A MULTI-RAN COMMUNICATION SYSTEM," filed Feb. 3, 2006.

This application is related to a co-pending application Ser. No. 11/466,537, entitled "METHOD AND APPARATUS FOR CROSS PAGING A MULTI-NETWORK COMMUNICATION SYSTEM," filed Aug. 23, 2006, which is assigned to the assignee of the present application.

This application is related to a co-pending application Ser. No. 11/430,101, entitled "METHOD AND APPARATUS FOR AN EXCHANGE OF PACKET DATA BETWEEN A WIRELESS ACCESS TERMINAL AND A PACKET SWITCHED COMMUNICATION SYSTEM VIA A CIRCUIT SWITCHED COMMUNICATION SYSTEM," filed May 8, 2006, which is assigned to the assignee of the present application.

This application is related to a co-pending application Ser. No. 11/415,793, entitled "CROSS-PAGING BETWEEN COMMUNICATION NETWORKS," filed May 2, 2006, which is assigned to the assignee of the present application.

FIELD OF THE INVENTION

The present invention relates generally to communication systems and, in particular, to supporting mobility in inter-technology networks.

BACKGROUND OF THE INVENTION

Operators are beginning to roll out circuit-packet, inter-technology networks where a circuit RAN (radio access network) delivers circuit services support and a packet data RAN delivers packet data services support to a user via 'dual mode' mobile station device or a hybrid mobile capable of communicating with both a circuit RAN and a packet data RAN via two access network technologies.

Circuit services support typically includes traditional circuit voice service, Short Message Service (SMS), etc., while packet data services include support for internet applications such as VoIP (Voice over IP), Video Telephony, Instant Messaging, email, etc.

A circuit RAN may include for example a cdma2000 1x RAN as specified by the 3GPP2 A.S00011-CS0008-A and A.S0009-A, and/or some other IEEE 802.x-based packet data network (802.16, e.g.).

FIG. 1 is a block diagram depiction of a wireless communication system 100 in accordance with the prior art. FIG. 1 depicts a circuit-packet, inter-technology network in which the circuit RAN provides circuit voice services support and a packet data RAN such as an HRPD, WiMAX, or other IEEE 802.x-based packet data network provides packet data services to a user of a dual technology mobile. It is assumed here that the circuit network does not support packet data services.

FIGS. 2 and 7 are respective block diagram depictions of 3GPP2 A.S0008-B and A.S0009-B inter-technology networks 200 and 700 in which the circuit RAN provides circuit voice service support and an HRPD RAN provides packet data services to a user of a dual mode mobile. The IWS Function, as specified in A.S0008-B, for example, may be collocated at either the 1x BS or at the HRPD AN, or may exist as a standalone entity. When the IWS function is collocated at the 1x BS, an A21 interface terminates at the 1x BS and the HRPD AN. When the IWS function is collocated at the HRPD AN, an A1/A1p interface is supported by the HRPD RAN and terminates at the MSC and the HRPD AN, and the A21 interface is internal to the HRPD AN. When the IWS exists as a standalone entity, an A1/A1p and A21 interface is supported by the HRPD RAN. The A1/A1p interface terminates at the MSC and the IWS, and the A21 interface terminates at the IWS and the HRPD AN.

In these types of circuit-packet, inter-technology networks, a dual mode mobile currently active with a call is typically 'cross-paged' by the corresponding inter-connected serving RAN, since dual mode mobiles may only be able to monitor incoming signaling from a single air interface at a time. Messages between the circuit RAN and the packet data RAN are exchanged over an inter-technology signaling interface (e.g., an A21 connection). For example, messages originating from the circuit network are sent by a circuit node in the circuit RAN over the inter-technology interface to a packet data node which is providing packet data services to the mobile in the packet data RAN. U.S. patent application Ser. No. 11/141,926, entitled "METHOD AND APPARATUS TO FACILITATE INTER-OPERABILITY BETWEEN A 3G1X NETWORK AND A WIRELESS PACKET DATA NETWORK," may be referenced for examples of how a packet RAN may be notified of an incoming circuit voice call from a 1x circuit network.

In order for multiple networks to effectively and efficiently serve a multi-mode mobile, the mobility of the mobile must be adequately supported by the networks involved in providing service. In other words, the network nodes from each overlaid network must adequately keep track of the mobile as it moves from one service area to the next within such a system. If the mobility of the mobile is not adequately supported, functionality such as cross-paging will not operate effectively and efficiently as the mobile moves throughout the system. Accordingly, it would be highly desirable to have a method and apparatus for supporting mobility in an inter-technology network.

BRIEF DESCRIPTION OF THE DRAWINGS

FIG. 7 is a block diagram depiction of 3GPP2 A.S0009-B inter-technology network in which a circuit RAN provides circuit voice service support and an HRPD RAN provides packet data services in accordance with the prior art.

Specific embodiments of the present invention are disclosed below with reference to FIGS. 3-6. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the signaling flow diagrams above are described and shown with reference to specific signaling exchanged in a specific order, some of the signaling may be omitted or some of the signaling may be combined, sub-divided, or reordered without departing from the scope of the claims. Thus, unless specifically indicated, the order and grouping of the signaling depicted is not a limitation of other embodiments that may lie within the scope of the claims Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described for supporting mobility in an inter-technology network. Such a network includes multiple interconnected access networks, utilizing various access technologies, and perhaps having overlapping, but non-aligned coverage areas. The prior art relies on remote units to originate registration signaling as they move from one service coverage area or registration region to the next, for each of the various access networks. In contrast, embodiments of the present invention utilize network originated signaling to update overlapping networks/network nodes of mobility events of which one access network is aware but of which other access networks may not be aware.

Figure 1:
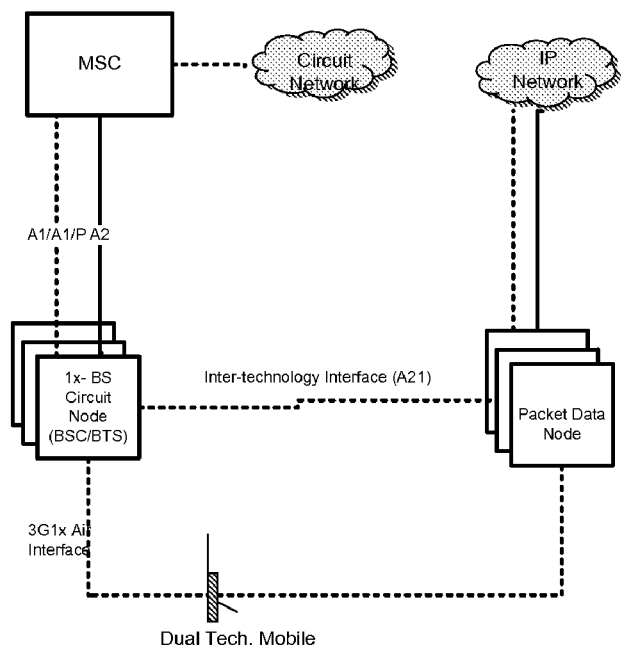
FIG. 1 is a block diagram depiction of a wireless communication system in accordance with the prior art.
Figure 2:
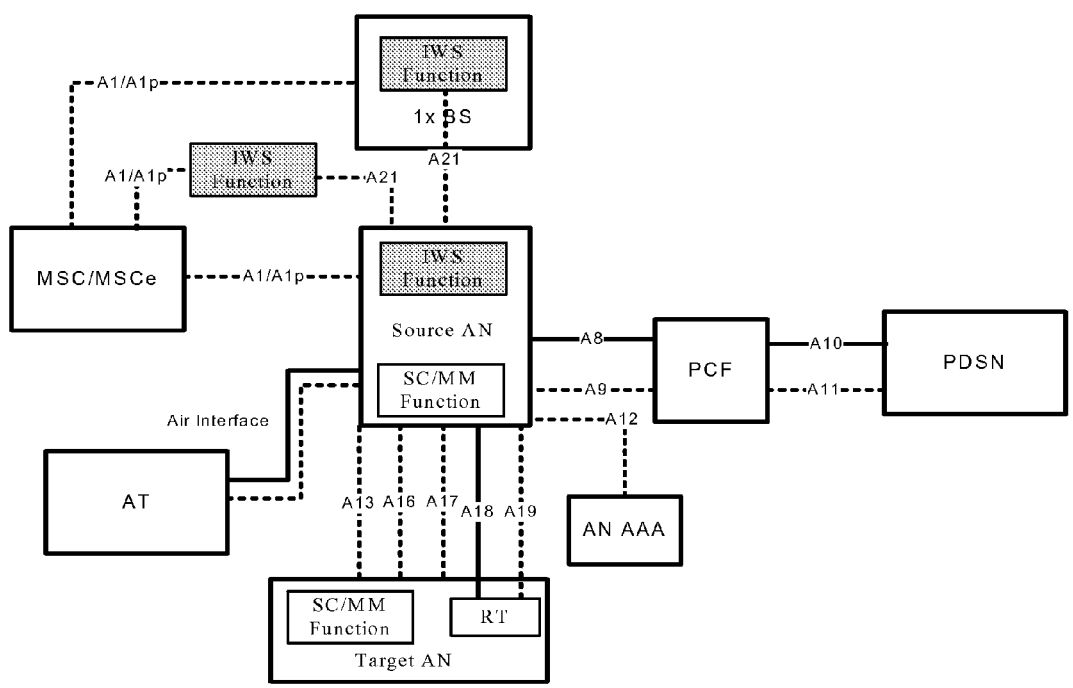
FIG. 2 is a block diagram depiction of 3GPP2 A.S0008-B inter-technology network in which a circuit RAN provides circuit voice service support and an HRPD RAN provides packet data services in accordance with the prior art.
Figure 3:
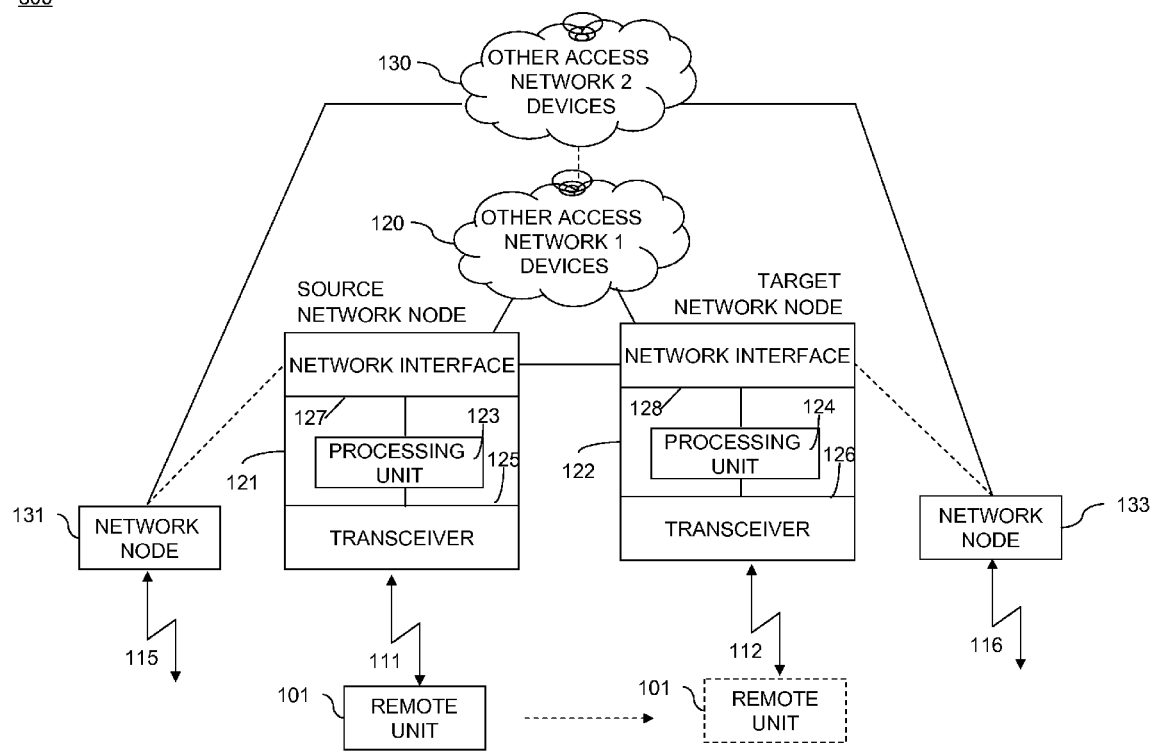
FIG. 3 is a block diagram depiction of a wireless communication system in accordance with multiple embodiments of the present invention.

The disclosed embodiments can be more fully understood with reference to FIGS. 3-6. FIG. 3 is a block diagram depiction of a wireless communication system 300 in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for wireless telecommunications systems. (These groups may be contacted via http://www.openmobilealliance.com, http://www.3gpp.org/, http://www.3gpp2.com/ and http://www.ieee802.org/, respectively.) Communication system 300 represents a system having an architecture in accordance with one or more of the 3GPP2 and/or IEEE 802 technologies, suitably modified to implement the present invention. For example, access network 1 (represented by devices 120-122) may have an architecture based on a technology such as CDMA2000 1x, HRPD (High Rate Packet Data), WiMAX (Worldwide Interoperability for Microwave Access), or an IEEE 802.x-based technology, while access network 2 (represented by devices 130, 131 and 133) may have an architecture based on a different technology from this list. Clearly, many technology combinations are possible, just by selecting from the list above. In addition, alternative embodiments of the present invention may be implemented in communication systems that employ other or additional technologies such as, but not limited to, those described in the 3GPP specification.

Communication system 300 is depicted in a very generalized manner. In particular, network nodes 121 and 122 are shown respectively communicating via wireless interfaces 111 and 112 with remote unit 101, these interfaces being in accordance with the particular access technology utilized by access network 1. Similarly, network nodes 131 and 133 are shown respectively communicating via wireless interfaces 115 and 116 (with remote units sometimes including remote unit 101, although not depicted as such in FIG. 3), these interfaces being in accordance with the particular access technology utilized by access network 2. Those skilled in the art will recognize that FIG. 3 does not depict all of the physical fixed network components that may be necessary for system 300 to operate but only those system components and logical entities particularly relevant to the description of embodiments herein.

For example, FIG. 3 depicts network nodes 121 and 122 as respectively comprising processing units 123 and 124, transceivers 125 and 126 and network interfaces 127 and 128. In general, components such as processing units, transceivers and network interfaces are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, network nodes 121 and 122 represent known devices that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, a network node may be implemented in or across one or more RAN components, such as a base transceiver station (BTS) and/or a base station controller (BSC) or an HRPD AN and/or PCF, or implemented in or across one or more access network (AN) components, such as an access service network (ASN) gateway and/or ASN base station (BS), an access point (AP), a wideband base station (WBS), and/or a WLAN (wireless local area network) station.

Remote unit 101 and network nodes 121 and 122 are shown communicating via technology-dependent, wireless interfaces. Remote units, subscriber stations (SSs) or user equipment (UEs), may be thought of as mobile stations (MSs); however, remote units are not necessarily mobile nor able to move. In addition, remote unit platforms are known to refer to a wide variety of consumer electronic platforms such as, but not limited to, mobile stations (MSs), access terminals (ATs), terminal equipment, mobile devices, gaming devices, personal computers, and personal digital assistants (PDAs). In particular, remote unit 101 comprises a processing unit (not shown) and transceiver (not shown). Depending on the embodiment, remote unit 101 may additionally comprise a keypad (not shown), a speaker (not shown), a microphone (not shown), and a display (not shown). Processing units, transceivers, keypads, speakers, microphones, and displays as used in remote units are all well-known in the art.

Operation of embodiments in accordance with the present invention occurs substantially as follows, first with reference to FIG. 3. Processing unit 123 of network node 121 provides communication services to remote unit 101 in accordance with the capability (and perhaps the configuration) of the access technology that access network 1 and network node 121 utilize. A mobility event occurs when remote unit 101 moves from network node 121 to network node 122. A service, or perhaps services, that network node 121 was providing to remote unit 101 is handed off. Note that a mobility event may be associated with one or more services in either an active or dormant/idle state. To accomplish this, processing units 123 and 124 perform technology-dependent signaling, via transceivers 125 and 126 (with remote unit 101) and/or via network interfaces 127 and 128 (with each other and/or other devices 120), to hand off the service involving remote unit 101 from network node 121 to network node 122. Thus, the handoff signaling may be signaling to handoff an active, dormant, or idle mode service. Triggered by either the completion or some other aspect of the process of handing off (or handing over) the service or by the detection that network node 121 is no longer providing network access to remote unit 101 (such as a situation in which remote unit 101 powers down or remote unit 101's wireless signal is lost (RF loss, e.g.)), processing unit 123 indicates to network node 131 via network interface 127 that network node 121 is no longer providing network access to remote unit 101.

For the sake of this illustration, network nodes 121 and 131 are presumed to have at least partially overlapping coverage areas. They are also presumed to provide network access to remote unit 101 using different access network technologies. Thus, access network 2 may attempt to signal remote unit 101 via network node 131 and network node 121, while node 121 is serving remote unit 101. This may take the form of a cross-page, as discussed above, for example. However, once remote unit 101 begins to obtain service from node 122 instead of node 121, it is undesirable for access network 2 to signal remote unit 101 via network node 131 and network node 121. Such an attempt would likely fail, wasting signaling resources in the process.

Triggered by either the completion or some other aspect of the process of handing off/handing over the service, processing unit 124 indicates to network node 133 via network interface 128 that network node 122 is now providing network access to remote unit 101. Thus, with this updated information, access network 2 may now attempt to signal remote unit 101 via node 133 and node 122 instead of via nodes 131 and 121, thereby increasing the chances of success. Network node 122 sends the indication to node 133 in the above description; however, depending on the particular topology of the respective coverage areas, node 122 may have indicated to node 131, instead of node 133, that that network node 122 was now providing network access to remote unit 101.

In system configurations in which the coverage areas of nodes 122 and 133 are substantially aligned, remote unit 101 will enter the coverage area of node 133 for the purpose of access network 2 services as it enters the coverage area of node 122 for the purpose of access network 1 services. Thus, node 122 sends the indication to node 133, in this case. In system configurations in which the coverage areas of nodes 122 and 131 only partially overlap, remote unit 101 may remain in the coverage area of node 131 as it enters the coverage area of node 122. Thus, node 122 sends the indication to node 131, in such a case.

To provide even greater instruction in making and using various aspects of the present invention, a discussion of certain embodiments in greater detail follows. In particular, these embodiments are discussed in the context of some problems that have been discovered in circuit-packet dual technology networks. However, the problems and solutions described below are present in and generally applicable to 3GPP2 and PP2-IEEE/WiMAX inter-technology networks, i.e., in and to packet-packet inter-technology networks as well as circuit-packet inter-technology networks.

Figure 4:
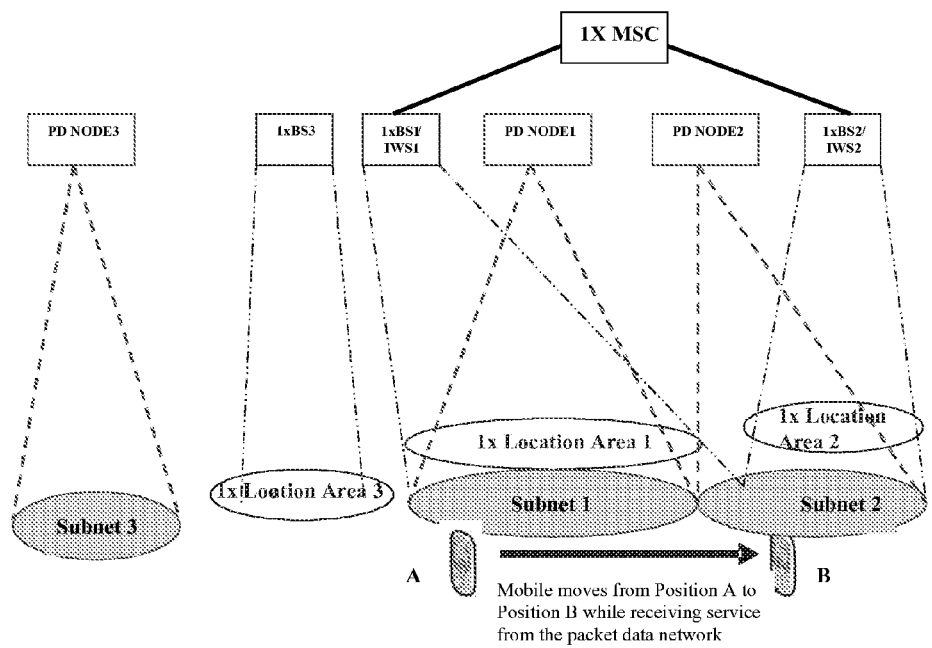
FIG. 4 is a block diagram depiction of a circuit-packet inter-technology communication system in accordance with multiple embodiments of the present invention.

FIG. 4 is a block diagram depiction of a circuit-packet inter-technology communication system 400 in accordance with multiple embodiments of the present invention. A description of problem 1 follows. In the FIG. 4, the user moves from PD NODE1 (subnet 1) to a new PD NODE2 (subnet 2) within the packet data RAN during an active packet data call in the HRPD RAN. The mobile is now in subnet2 under the domain of PD NODE2 in the PD RAN and possibly also in a new 1x location area 2 under the domain of a new 1xBS2/IWS2 in the 1x RAN. Several scenarios are possible:

a) If the 1x location area has not changed, i.e., the mobile is still in 1x location area 1 under the domain of 1xBS1/IWS1, the mobile will not perform 1x registration over the air via the CSNA protocol since the location area has not changed. [Note: 1x mobile registration is described in 3GPP2 C.S0005 and the HRPD CSNA protocol is specified in 3GPP2/C.S0024-A).]

b) If as a result of the mobility the dual-mode mobile has moved into subnet 2, is under the domain of a new PD NODE2 and a new location area, 1x location area 2 under node 1xBS2/IWS2's domain, and it is busy exchanging packet data with the HRPD RAN, the mobile will not be aware that it is under the domain of 1xBS2/IWS2 since it will not be monitoring the 1x air interface and hence will not perform 1x registration over the air via CSNA (assuming it has been configured to do so).

c) A dual-mode mobile may not be configured to perform registration (via CSNA) after moving to a new 1xBS/location area (e.g., another registration trigger such as distance or time based registration may be in effect—see C.S0005).

d) If the mobile is configured to perform 1x registration over the air via CSNA and the registration is forwarded to the 1x RAN as described in U.S. patent application Ser. No. 11/141,926, entitled "METHOD AND APPARATUS TO FACILITATE INTER-OPERABILITY BETWEEN A 3G1X NETWORK AND A WIRELESS PACKET DATA NETWORK," or PD NODE2 performs 1x registration on behalf of the dual-mode mobile after an intra-HRPD handoff occurs so that the MSC in 1x RAN and 1xBS2/IWS2 are aware that the dual-mode mobile is now under the domain of 1xBS2/IWS2, 1xBS1/IWS1 is still unaware that the mobile is no longer under it domain, or the domain of PD NODE1.

e) When the mobile moves deep into the packet data RAN's coverage area to a new subnet, subnet 3, under PD NODE3's domain such that it no longer has 1x coverage, i.e., it has moved away from an inter-technology seam and is no longer under the domain of any 1xBS/IWSs, the mobile will not send CSNA 1x registration after going idle (assuming it is configured to do so), and the new target PD NODE3 cannot register on behalf of the mobile either since there is no signaling connection from it to the 1x RAN.

f) An additional scenario that can occur is when the dual mode mobile returns to the 1x network (i.e., the mobile is now monitoring the 1x overhead signaling channel) after mobility in the packet data network. The mobile will likely be listening to target 1xBS2 after the mobility. When 1xBS1/IWS1 receives a page request from the MSC for the dual-mode mobile as a result of a broad page (MSC sends pages to multiple 1xBS to increase the chances of finding the mobile), instead of forwarding the page request over the 1x air interface which the mobile is now monitoring), 1xBS1/IWS1 will forward the page to PD NODE1 since it still maintains registration information mapping the dual-mode mobile to PD NODE1 and believes the mobile is located there. This results in wastage of paging resources at 1xBS1/IWS1 and unnecessary signaling over the inter-technology interface communication interface.

In all of these scenarios, when 1xBS1/IWS1 receives a paging request from 1x MSC and notifies PD NODE1 in the HRPD RAN of an incoming circuit voice call for the dual-mode mobile via an inter-technology interface as described in U.S. patent application Ser. No. 11/141,926, HRPD NODE1 will reject the 1x cross paging notification from 1xBS1/IWS1 since it no longer supports a packet data session for the mobile and no longer has any information about the mobile or its location. Hence, it is important that the 1x RAN be notified of this mobility and the mobile be deregistered from 1xBS1/IWS2 so it no longer attempts to page the mobile for circuit voice services via the PD RAN.

A PD node providing service to a mobile may overlay multiple 1xBSs and therefore may connect to multiple 1xBSs via multiple A21 connections. In HRPD PD systems, the HRPD PD NODE determines which 1xBS/A21 connection to send a message to page for packet data service based on the RouteUpdateTriggerCode received in the C.S0024-A RouteUpdate message sent when the mobile moves to a new subnet.

Thus, a method is clearly needed to notify the 1x RAN, specifically the 1x MSC, the source BS (1xBS1), and the target BS (1xBS2) when there is connectivity to it, i.e., when a dual-mode mobile has moved to a new packet data node (or packet data subnet) within a packet data RAN, or returned to the 1x RAN so that the source 1xBS/IWF is notified and stops forwarding pages to the packet data RAN (i.e., cross-paging).

A description of problem 2 follows. A dual-mode mobile with a packet data session anchored in the PD RAN may be monitoring 1x air interface signaling and receiving 1x circuit voice services. When the mobile performs a handoff to a new 1xBS2/IWS2, at least three cases are possible:

(a) the PD NODE where the mobile's packet data session is anchored overlays both the old BS1/IWS1 and new BS2/IWS2, and the mobile hands off to a new 1xBS but no PD mobility occurs (mobile is in same PD node domain);

(b) as a result of the 1x mobility to a new 1xBS, the mobile has moved from PD NODE1 to PD NODE2's domain; and (c) as a result of 1x mobility to a new 1xBS, the mobile has moved to location area 3 under BS3's domain away from the inter-technology seam and is no longer under the domain of any PD NODE in the packet data network and can no longer return to the packet data network to receive packet data services.

For case (a), the PD RAN is unaware of the 1x mobility. If packet data arrives for the mobile at PD NODE1 (for example, a video telephony call), PD NODE1 will request 1xBS1 to page the mobile for HPRD packet data services (where it believes the mobile is located). The mobile is no longer registered or under the domain of 1xBS1/IWS1, so if BS1 tries to page the mobile for packet data service, the page will fail.

For case (b), in addition to the problem described for case (a), the data will arrive for the mobile at PD NODE1 instead of PD NODE 2, whose domain the mobile falls under. If BS2/IWS2 notifies PD NODE2 that the mobile is now under its domain, when 1xBS2/IWS2 is requested to page the mobile for PD services, the mobile moves to PD NODE2 for services. However, since it is not registered there, the mobile's packet data session/context information must first be handed off from PD NODE1 to PD NODE2 before it can begin to receive packet data services. This results in delayed packet data call delivery and would be unacceptable for real time services such as video telephony.

For case (c), if as a result of 1x mobility, the mobile has moved to a target 1xBS3 away from the inter-technology seam (i.e., deep within the 1x network where it cannot be paged or return to an overlaid packet data node for packet data service) and if data arrives at PD NODE1 and it requests 1xBS1 to page the mobile for packet data service, the mobile will not receive the page since it is no longer monitoring signaling from 1xBS1/IWS1 and the page for packet data service will fail. Nor can it return to the packet data RAN even if the page was somehow successfully routed.

Therefore a method is clearly needed to notify the PD RAN, when the mobile moves within the circuit network so that a) the new 1xBS, where the mobile is currently receiving circuit service, is requested by the PD node to page the mobile for packet data service instead of the old 1xBS1/IWS1 (assuming mobile is still within overlaid coverage of the packet data RAN) b) the new and old packet data nodes (PD NODE1, PD NODE2) are notified so that the mobile's packet data session/context information can be moved to the new packet data node PD NODE2) where the mobile will be served, prior to arriving for packet data service at the PD RAN c) if the mobile can no longer return to the PD RAN for packet data services, the PD RAN is notified, so it no longer pages it and may even release packet data resources reserved for the mobile.

To address problem 1, PD NODE 1 notifies BS1 that the mobile has left its domain. BS1 clears mapping information for the mobile and will not forward messages any longer to PD NODE1. PD NODE2, if it has connectivity to the 1x network, notifies the correct 1xBS (may be a new BS), based on the RouteUpdateTriggerCode received from mobile if connected to multiple BSs, that the mobile is now under its domain. This 1xBS (may be a new 1xBS2) creates a mapping for the mobile to the new PD NODE2 and A21 and sends future 1x signaling and messages for this mobile to the new PD NODE2.

Figure 5:
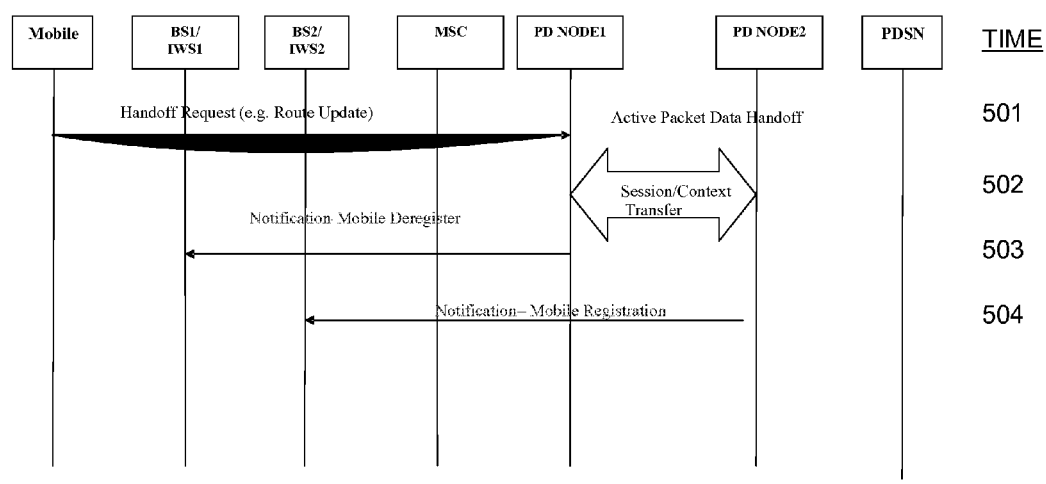
FIG. 5 is an exemplary signaling flow diagram that depicts a mobile with an active packet data session handing off from a first packet data (PD) node to a second packet data (PD) node, in accordance with multiple embodiments of the present invention.

FIG. 5 is an exemplary signaling flow diagram that depicts a mobile with an active packet data session handing off from a first PD node to a second packet data (PD) node, in accordance with multiple embodiments of the present invention. The following is a detailed description of the call flow timeline as labeled on the rightmost column of FIG. 5:

501. The mobile initiates a handoff from PD NODE1 to PD NODE2.

502. The mobile's session and context information is transferred from the source PD NODE1 to target PD NODE2 and the handoff is completed to PD NODE2.

503. PD NODE1 sends a message to notify circuit network BS1 that it is no longer supporting a packet data session for the mobile. BS1 clears the mapping information to the PD NODE1 and the inter-technology interface (A21). BS1 will no longer forward any paging or other messages it receives for the mobile to PD NODE1.

504. PD NODE2 sends a message to notify BS2 that it is supporting the packet data session for the mobile. BS2 maps the mobile to PD NODE2 and/or the A21 connection to it.

(BS1 and BS2 may be the same if the 1x coverage area did not change. In this case, mobile mapping information for the mobile is simply updated to point to the new PD node and/or inter-technology interface (A21) which terminates to a new PD NODE2.)

To address problem 2, cases (a) and (b), 1xBS2/IWS2 notifies the PD RAN that the mobile has moved so that if data arrives in the PD network for the mobile, the serving PD NODE notifies the new 1xBS2/IWS2 to page the mobile for packet data service. If 1xBS2/IWS2 connects to multiple HRPD PD NODES, 1xBS2/IWS2 knows which PD NODE to notify based on the subnet color code as specified in 3GPP2/C.S0075.

For case (b), after PD NODE2 is notified via A21 that the mobile is in its domain, PD NODE2 notifies PD NODE1 that the mobile has left its domain. Optionally, PD NODE2 initiates session/context transfer over (A13 for HRPD or R4 for WiMAX) which also serves to notify the old PD NODE1 that it can clear its mapping information for the mobile (mobile to A21 or BS mapping). This enhances packet data service by allowing the mobile to quickly reconnect to a packet data call by not having to first initiate a dormant mode handoff to transfer its session/context information over to the new packet data node.

For case (c) if the mobile has moved to a new 1xBS2, away from the inter-technology seam such that it can no longer receive packet data service in which case 1xBS2 may not have an A21 connection to the mobile, old 1xBS1 notifies the PD RAN, specifically PD NODE 1, so that it no longer attempts to page the mobile for packet data services when data arrives for it. When the mobile hands off from 1xBS1 to 1xBS2, 1xBS1 sends notification to PD NODE1 that the mobile has left its coverage. PD NODE 1 clears its mapping information for the mobile and no longer requests to page the mobile for packet data service via 1xBS1 or any 1xBS.

Figure 6:
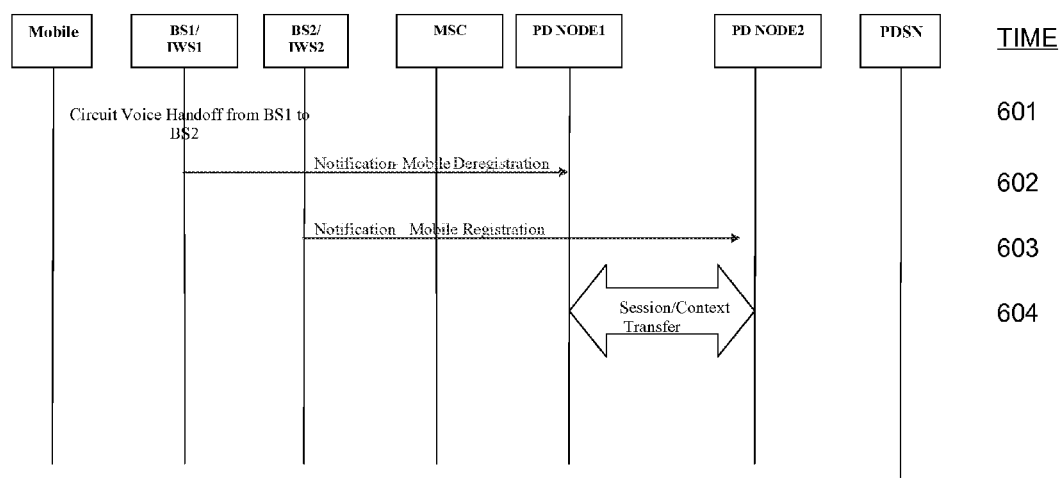
FIG. 6 is an exemplary signaling flow diagram that depicts a mobile with an active circuit voice service handing off from a first circuit network node to a second circuit network node, in accordance with multiple embodiments of the present invention.

FIG. 6 is an exemplary signaling flow diagram that depicts a mobile with an active circuit voice service handing off from a first circuit network node to a second circuit network node, in accordance with multiple embodiments of the present invention. The following is a detailed description of the call flow timeline as labeled on the rightmost column of FIG. 6:

601. The mobile circuit voice call is handed off from BS1 to BS2 in the circuit network.

602. Upon successful completion of the circuit voice handoff, source BS1/IWS1, which previously supported the call, notifies PD NODE1 that the mobile is no longer in its coverage zone. PD NODE1 clears its mapping information for the call. The packet data network will no longer request paging for packet data services until registration notification is received at a new PD NODE (covers case where mobile may have left packet data coverage area—case (c)).

603. Upon successful completion of the circuit voice handoff, target BS2 which is now supporting the circuit voice call for the mobile sends a message to PD NODE2 that that the mobile is now within it domain. (BS2 knows which packet data node to send the message to either due to a single inter-technology interface to PD NODE2, or if it supports multiple inter-technology interfaces to multiple PD NODES, based on the subnet color code as specified in C.S0075).

604. PD NODE2 may initiate a mobile session/context transfer from PD NODE1 to PD NODE2. This prepares the packet data RAN so a handoff doesn't have to be performed after the mobile returns to the packet data RAN.

(PD NODE2 may be the same as PD NODE1 if the packet data coverage area (Subnet) did not change. In this case, PD NODE1 simply updates it mapping information for the mobile to BS2 and the A21 connection terminating to it.)

One of skill in the art will appreciate that various modifications and changes may be made to the specific embodiments described above without departing from the spirit and scope of the present invention. Thus, the discussion of certain embodiments in greater detail above is to be regarded as illustrative and exemplary rather than restrictive or all-encompassing, and all such modifications to the specific embodiments described above are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, and the like, are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") are intended to encompass all the various techniques available for communicating or referencing the object being indicated. Some, but not all examples of techniques available for communicating or referencing the object being indicated include the conveyance of the object being indicated, the conveyance of an identifier of the object being indicated, the conveyance of information used to generate the object being indicated, the conveyance of some part or portion of the object being indicated, the conveyance of some derivation of the object being indicated, and the conveyance of some symbol representing the object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for supporting mobility in an inter-technology network comprising:
    performing, by a second base station, signaling to hand off a service involving a mobile station from a first base station to the second base station;
    indicating directly, to a third base station by the second base station as a result of the handoff-related signaling, that the second base station is now providing access network service to the mobile station,
    wherein the second base station provides access network service to the mobile station using a different access network technology than that utilized by the third base station.

2. The method of claim 1, wherein indicating directly that the second base station is now providing access network service to the mobile station comprises
    notifying the third base station that the second base station is now providing access network service to the mobile station.

3. The method of claim 2, wherein indicating directly that the second base station is now providing access network service to the mobile station comprises
    sending a message to the third base station indicating a mobile registration with the second base station.

4. The method of claim 1,
    wherein the first base station and the second base station each comprise a circuit network node,
    wherein the third base station comprises a packet network node, and
    wherein performing by the second base station signaling to hand off the service involving the mobile station comprises performing by the second base station signaling to hand off a circuit service of the mobile station from the first base station to the second base station.

5. The method of claim 4, further comprising
    receiving, by the third base station, the indication that the second base station is now providing access network service to the mobile station;
    associating, by the third base station in response to receiving the indication, the mobile station to the second base station for the purpose of circuit network-based service notification.

6. The method of claim 1, further comprising
    receiving, by the third base station, the indication that the second base station is now providing access network service to the mobile station;
    initiating, by the third base station in response to receiving the indication, a transfer of a session/context for the mobile station from a packet network node that previously provided access network service to the mobile station.

7. The method of claim 1,
    wherein the first base station and the second base station each comprise a packet network node,
    wherein the third base station comprises a circuit network node, and
    wherein performing by the second base station signaling to hand off the service involving the mobile station comprises performing by the second base station signaling to hand off at least one of an active packet data service, a dormant packet data service, and an idle packet data service of the mobile station from the first base station to the second base station.

8. The method of claim 7, further comprising
    receiving, by the third base station, the indication that the second base station is now providing access network service to the mobile station;
    associating, by the third base station in response to receiving the indication, the mobile station to the second base station for the purpose of packet network-based services.

9. The method of claim 1, wherein performing by the second base station signaling to hand off the service involving the mobile station comprises
    performing, by the second base station, signaling to support a transfer of a session/context for the mobile station from the first base station to the second base station.

10. A method for supporting mobility in an inter-technology network comprising:
    performing, by a first base station, one of
        signaling to hand off a service involving a mobile station from the first base station to a second base station and
        detecting that the first base station is no longer providing access network service to the mobile station;
    indicating directly, to a third base station by the first base station as a result of the handoff-related signaling, that the first base station is no longer providing access network service to the mobile station,
    wherein the first base station provides access network service to the mobile station using a different access network technology than that utilized by the third base station.

11. The method of claim 10, wherein indicating directly that the first base station is no longer providing access network service to the mobile station comprises
    notifying the third base station that the first base station is no longer providing access network service to the mobile station.

12. The method of claim 11, wherein indicating directly that the first base station is no longer providing access network service to the mobile station comprises
    sending a message to the third base station indicating a mobile deregistration from the first base station.

13. The method of claim 10,
    wherein the first base station and the second base station each comprise a circuit network node,
    wherein the third base station comprises a packet network node, and
    wherein performing by the first base station signaling to hand off the service involving the mobile station comprises performing by the first base station signaling to hand off a circuit service involving the mobile station from the first base station to the second base station.

14. The method of claim 13, further comprising
    receiving, by the third base station, the indication that the first base station is no longer providing access network service to the mobile station;
    disassociating, by the third base station in response to receiving the indication, the mobile station from the first base station for the purpose of packet data service notification.

15. The method of claim 10,
    wherein the first base station and the second base station each comprise a packet network node,
    wherein the third base station comprises a circuit network node, and
    wherein performing by the first base station signaling to hand off the service involving the mobile station comprises performing by the first base station signaling to hand off at least one of an active packet data service, a dormant packet data service, and an idle packet data service of the mobile station from the first base station to the second base station.

16. The method of claim 10, wherein performing by the first base station signaling to hand off the service involving the mobile station comprises performing, by the first base station, signaling to support a transfer of a session/context for the mobile station from the first base station to the second base station.

17. A base station comprising:

a transceiver;

a network interface; and a processing unit, communicatively coupled to the transceiver and the network interface, adapted to perform signaling, via at least one of the transceiver and the network interface, to hand off a service involving a mobile station from a source base station to a target base station, and adapted to indicate directly, to third base station via the network interface and as a result of the handoff-related signaling, that the target base station is now providing access network service to the mobile station, wherein the target base station provides access network service to the mobile station using a different access network technology than that utilized by the third base station.

18. The base station of claim 17, wherein the target base station provides access network service to the mobile station by utilizing an access technology from the group of CDMA2000 1x, HRPD (High Rate Packet Data), WiMAX (Worldwide Interoperability for Microwave Access), and an IEEE 802.x-based technology.

19. A base station comprising:

a transceiver;

a network interface; and a processing unit, communicatively coupled to the transceiver and the network interface, adapted to perform signaling, via at least one of the transceiver and the network interface, to hand off a service involving a mobile station from a source base station to a target base station, and adapted to indicate directly, to third base station via the network interface and as a result of the handoff-related signaling, that the source base station is no longer providing access network service to the mobile station, wherein the source base station provides access network service to the mobile station using a different access network technology than that utilized by the third base station.

* * * * *